(12) United States Patent
Grant et al.

(10) Patent No.: US 10,887,045 B2
(45) Date of Patent: Jan. 5, 2021

(54) CONTROLLABLE CSI-RS DENSITY

(71) Applicant: TELEFONAKTIEBOLAGET LM ERICSSON (PUBL), Stockholm (SE)

(72) Inventors: Stephen Grant, Pleasanton, CA (US); Mattias Frenne, Uppsala (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 0 days.

(21) Appl. No.: 16/345,411

(22) PCT Filed: Dec. 7, 2017

(86) PCT No.: PCT/IB2017/057739
§ 371 (c)(1),
(2) Date: Apr. 26, 2019

(87) PCT Pub. No.: WO2018/104912
PCT Pub. Date: Jun. 14, 2018

(65) Prior Publication Data
US 2019/0268088 A1    Aug. 29, 2019

Related U.S. Application Data

(60) Provisional application No. 62/431,743, filed on Dec. 8, 2016.

(51) Int. Cl.
*H04L 1/00* (2006.01)
*H04B 7/0417* (2017.01)
(Continued)

(52) U.S. Cl.
CPC ......... *H04L 1/0026* (2013.01); *H04B 7/0417* (2013.01); *H04B 7/0469* (2013.01);
(Continued)

(58) Field of Classification Search
CPC .............. H04W 24/10; H04W 72/0446; H04L 5/0057; H04L 5/0094; H04L 5/005;
(Continued)

(56) References Cited

U.S. PATENT DOCUMENTS

| 8,774,226 B2 | 7/2014 | Guo et al. |
| 2013/0208678 A1 | 8/2013 | Zhang |

(Continued)

FOREIGN PATENT DOCUMENTS

RU        2493657 C1    9/2013

OTHER PUBLICATIONS

Intel Corporation, "Discussion on CSI-RS design for NR," 3GPP TSG RAN WG1 Meeting #86-bis, R1-1609528; Lisbon, Portugal, Oct. 10-14, 2016, 6 pages.
(Continued)

*Primary Examiner* — Jung Liu

(57) ABSTRACT

Methods and apparatus for configuring, in a network node of a wireless communication network, a reference signal resource used to perform channel-state information, CSI, measurements with one or more wireless devices. In an example method, a reference signal resource is aggregated in one or more of a frequency and a time domain, and a density characteristic of the aggregated reference signal resource that is to be transmitted to the one or more wireless devices is adjusted.

12 Claims, 19 Drawing Sheets

(51) Int. Cl.
*H04B 7/0456* (2017.01)
*H04B 7/06* (2006.01)
*H04L 5/00* (2006.01)
*H04W 72/04* (2009.01)

(52) U.S. Cl.
CPC ......... *H04B 7/0617* (2013.01); *H04B 7/0626* (2013.01); *H04L 5/00* (2013.01); *H04L 5/0051* (2013.01); *H04L 5/0094* (2013.01); *H04W 72/0446* (2013.01)

(58) Field of Classification Search
CPC ... H04L 1/0026; H04L 5/0051; H04B 7/0417; H04B 7/0626; H04B 7/0617; H04B 7/0469
See application file for complete search history.

(56) References Cited

U.S. PATENT DOCUMENTS

| | | | |
|---|---|---|---|
| 2015/0163730 A1 | 6/2015 | Zhang | |
| 2015/0201346 A1* | 7/2015 | Wu | H04L 5/0048 |
| | | | 370/252 |
| 2015/0289281 A1 | 10/2015 | Kim et al. | |
| 2016/0006546 A1* | 1/2016 | Yi | H04L 5/0094 |
| | | | 370/329 |
| 2016/0021551 A1 | 1/2016 | Park et al. | |
| 2016/0088594 A1 | 3/2016 | Xiong et al. | |
| 2016/0174093 A1* | 6/2016 | Zhou | H04W 24/10 |
| | | | 370/252 |
| 2016/0301511 A1* | 10/2016 | Yoon | H04L 5/0053 |

OTHER PUBLICATIONS

Intel Corporation, "On CSI-RS for NR," 3GPP TSG RAN WG1 Meeting #87, R1-1611977; Reno, USA, Nov. 14-18, 2016, 5 pages.
Ericsson, "Further discussion on CSI-RS pooling," 33GPP TSG-RAN WG1 #87, R1-1612352; Reno, USA, Nov. 14-18, 2016, 6 pages.
NTT Docomo, "Low-density CSI-RS and Port Sharing," 3GPP TSG RAN WG1 Meeting #87, R1-1612703; Reno, USA, Nov. 14-18, 2016, 3 pages.
Fujitsu, "Aggregated CSI-RS Configuration and Signaling," 3GPP TSG RAN WG1 Meeting #87, R1-1611463; Reno, USA, Nov. 14-18, 2016, 4 pages.
Ericsson, "CSI-RS design," 3GPP TSG RAN WG1 Meeting #87, R1-1612330; Reno, USA, Nov. 14-18, 2016, 6 pages.
Intel Corporation, "Discussion on CSI-RS for Class A FD-MIMO with overhead reduction," 3GPP TSG RAN WG1 Meeting #85, R1-164142; Nanjing, China, May 23-27, 2016, 7 pages.
Ericsson, "CSI-RS Design for Class A FD-MIMO," 3GPP TSG-RAN WG1#83, R1-157204; Anaheim, USA, Nov. 16-20, 2015, 10 pages.

\* cited by examiner

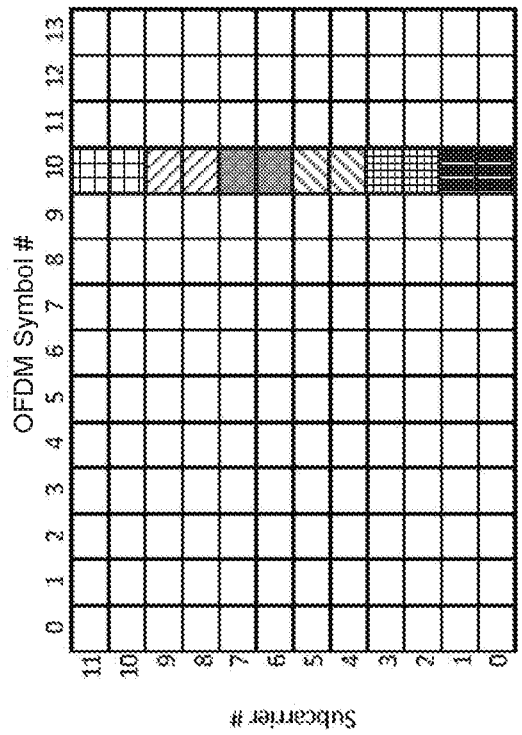
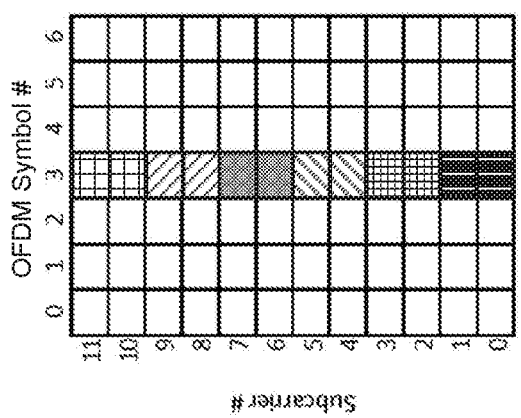
FIG. 16

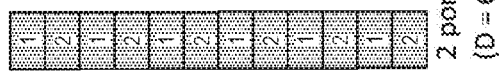
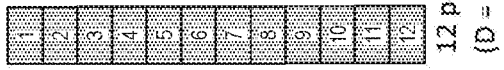
FIG. 18

CONTROLLABLE CSI-RS DENSITY

This application is a 371 of International Application No. PCT/IB2017/057739, filed Dec. 7, 2017, which claims the benefit of U.S. Provisional Application No. 62/431,743, filed Dec. 8, 2016, the disclosure of which is fully incorporated herein by reference.

TECHNICAL FIELD

The disclosed subject matter relates generally to telecommunications and more particularly to control of Channel State Information Reference Signal (CSI-RS) density in channels of a next generation mobile wireless communication system.

BACKGROUND

The next generation mobile wireless communication system (5G or NR), will support a diverse set of use cases and a diverse set of deployment scenarios. The latter includes deployment at both low frequencies (100s of MHz), similar to LTE today, and very high frequencies (mm waves in the tens of GHz). At high frequencies, propagation characteristics make achieving good coverage challenging. One solution to the coverage issue is to employ high-gain beamforming, typically in an analog manner, in order to achieve satisfactory link budget. Beamforming will also be used at lower frequencies (typically digital beamforming), and is expected to be similar in nature to the already standardized 3GPP LTE system (4G).

For background purposes, some of the key aspects of LTE are described in this section. Of particular relevance is the sub-section describing channel state information reference signals (CSI-RS). A similar signal will be designed also for NR, and is the subject of the present application.

Note that terminology used here such as eNodeB and UE should be considering non-limiting and does in particular not imply a certain hierarchical relation between the two; in general, "eNodeB" could be considered as device 1 and "UE" device 2, and these two devices communicate with each other over some radio channel. Herein, we also focus on wireless transmissions in the downlink, but the invention is equally applicable in the uplink.

LTE and NR use OFDM in the downlink and DFT-spread OFDM or OFDM in the uplink. The basic LTE or NR downlink physical resource can thus be seen as a time-frequency grid as illustrated in FIG. 6, where each resource element corresponds to one OFDM subcarrier during one OFDM symbol interval.

Moreover, as shown in FIG. 7, in the time domain, LTE downlink transmissions are organized into radio frames of 10 milliseconds, each radio frame consisting of ten equally-sized subframes of length $T_{subframe}=1$ millisecond.

Furthermore, the resource allocation in LTE is typically described in terms of resource blocks, where a resource block corresponds to one slot (0.5 millisecond) in the time domain and 12 contiguous subcarriers in the frequency domain. Resource blocks are numbered in the frequency domain, starting with 0 from one end of the system bandwidth. For NR, a resource block is also 12 subcarriers in frequency, but the number of OFDM symbols in the NR resource block has not yet been determined. It will be appreciated that the term "resource block," as used herein, will thus refer to a block of resources spanning a certain number of subcarriers and a certain number of OFDM symbols—the term as used herein may, in some instances, refer to a different sized block of resources from what is ultimately labeled a "resource block" in the standards for NR or in the standards for some other system.

Downlink transmissions are dynamically scheduled, i.e., in each subframe the base station transmits control information about to which terminals data is transmitted and upon which resource blocks the data is transmitted, in the current downlink subframe. This control signaling is typically transmitted in the first 1, 2, 3 or 4 OFDM symbols in each subframe in LTE, and in 1 or 2 OFDM symbols in NR. A downlink system with 3 OFDM symbols as control is illustrated in the downlink subframe illustrated in FIG. 8.

Codebook-Based Precoding

Multi-antenna techniques can significantly increase the data rates and reliability of a wireless communication system. The performance is particularly improved if both the transmitter and the receiver are equipped with multiple antennas, which results in a multiple-input multiple-output (MIMO) communication channel. Such systems and/or related techniques are commonly referred to as MIMO.

NR is currently evolving with MIMO support. A core component in NR is the support of MIMO antenna deployments and MIMO related techniques including beamforming at higher carrier frequencies. Currently, LTE and NR support an 8-layer spatial multiplexing mode for up to 32 Tx antennas with channel-dependent precoding. The spatial multiplexing mode is aimed for high data rates in favorable channel conditions. An illustration of the spatial multiplexing operation is provided in FIG. 9.

As seen, the information carrying symbol vector s is multiplied by an $N_T \times r$ precoder matrix W, which serves to distribute the transmit energy in a subspace of the $N_T$— (corresponding to $N_T$ antenna ports) dimensional vector space. The precoder matrix is typically selected from a codebook of possible precoder matrices, and typically indicated by means of a precoder matrix indicator (PMI), which specifies a unique precoder matrix in the codebook for a given number of symbol streams. The r symbols in s each correspond to a layer and r is referred to as the transmission rank. In this way, spatial multiplexing is achieved, since multiple symbols can be transmitted simultaneously over the same time/frequency resource element (TFRE). The number of symbols r is typically adapted to suit the current channel properties.

LTE and NR use OFDM in the downlink and hence the received $N_R \times 1$ vector $y_n$ for a certain TFRE on subcarrier n (or alternatively data TFRE number n) is thus modeled by $$y_n = H_n W s_n + e_n$$

where $e_n$ is a noise/interference vector obtained as realizations of a random process. The precoder, implemented by precoder matrix W, can be a wideband precoder that is constant over frequency or that is frequency selective.

The precoder matrix is often chosen to match the characteristics of the $N_R \times N_T$ MIMO channel matrix $H_n$, resulting in so-called channel-dependent precoding. This is also commonly referred to as closed-loop precoding and essentially strives for focusing the transmit energy into a subspace which is strong in the sense of conveying much of the transmitted energy to the UE. In addition, the precoder matrix may also be selected to strive for orthogonalizing the channel, meaning that after proper linear equalization at the UE, the inter-layer interference is reduced.

The transmission rank, and thus the number of spatially multiplexed layers, is reflected in the number of columns of the precoder. For efficient performance, it is important that a transmission rank that matches the channel properties is selected.

Channel State Information Reference Symbols (CSI-RS)

In LTE and NR, a reference symbol sequence was introduced for the purpose of estimating channel-state information, the CSI-RS. The CSI-RS provides several advantages over basing the CSI feedback on the common reference symbols (CRS) which were used, for that purpose, in previous releases. Firstly, the CSI-RS is not used for demodulation of the data signal, and thus does not require the same density (i.e., the overhead of the CSI-RS is substantially less). Secondly, CSI-RS provides a much more flexible means to configure CSI feedback measurements (e.g., which CSI-RS resource to measure on can be configured in a UE specific manner).

By measuring on a CSI-RS, a UE can estimate the effective channel the CSI-RS is traversing, including the radio propagation channel and antenna gains. In more mathematical rigor, this implies that if a known CSI-RS signal x is transmitted, a UE can estimate the coupling between the transmitted signal and the received signal (i.e., the effective channel). Hence if no virtualization is performed in the transmission, the received signal y can be expressed as $$y=Hx+e$$

and the UE can estimate the effective channel H.

Up to 32 CSI-RS ports can be configured for a LTE or NR UE, that is, the UE can thus estimate the channel from up to eight transmit antennas.

An antenna port is equivalent to a reference signal resource that the UE shall use to measure the channel. Hence, a base station with two antennas could define two CSI-RS ports, where each port is a set of resource elements in the time frequency grid within a subframe or slot. The base station transmits each of these two reference signals from each of the two antennas so that the UE can measure the two radio channels and report channel state information back to the base station based on these measurements. In LTE, CSI-RS resources with 1, 2, 4, 8, 12, 16, 20, 24, 28 and 32 ports are supported.

The CSI-RS utilizes an orthogonal cover code (OCC) of length two, to overlay two antenna ports on two consecutive REs. As seen in FIG. 10, which depicts resource element grids over an RB pair with potential positions for LTE Rel-9/10 UE specific RS (yellow), CSI-RS (marked with a number corresponding to the CSI-RS antenna port), and CRS (blue and dark blue), many different CSI-RS patterns are available. For the case of 2 CSI-RS antenna ports there are 20 different patterns within a subframe. The corresponding number of patterns is 10 and 5 for 4 and 8 CSI-RS antenna ports, respectively. For TDD, some additional CSI-RS patterns are available.

The CSI reference signal configurations are given by the table below, taken from LTE specifications TS 36.211 v.12.5.0. For example, the CSI RS configuration 5 for 4 antennas ports use (k',l')=(9,5) in slot 1 (the second slot of the subframe), and according to the formulas below, port 15,16, use OCC over the resource elements (k,l)=(9,5), (9,6) and port 17,18 use OCC over resource elements (3,5)(3,6) respectively (assuming PRB index m=0), where k is the subcarrier index and l is the OFDM symbol index.

The orthogonal cover code (OCC) is introduced below by the factor $w_{l''}$ $$k = k' + 12m + \begin{cases} -0 & \text{for } p \in \{15, 16\}, \text{ normal cyclic prefix} \\ -6 & \text{for } p \in \{17, 18\}, \text{ normal cyclic prefix} \\ -1 & \text{for } p \in \{19, 20\}, \text{ normal cyclic prefix} \\ -7 & \text{for } p \in \{21, 11\}, \text{ normal cyclic prefix} \\ -0 & \text{for } p \in \{15, 16\}, \text{ extended cyclic prefix} \\ -3 & \text{for } p \in \{17, 18\}, \text{ extended cyclic prefix} \\ -6 & \text{for } p \in \{19, 20\}, \text{ extended cyclic prefix} \\ -9 & \text{for } p \in \{21, 22\}, \text{ extended cyclic prefix} \end{cases}$$

$$l = l'' + \begin{cases} l'' & \text{CSI reference signal configurations 0-19, normal cyclic prefix} \\ 2l'' & \text{CSI reference signal configurations 20-31, normal cyclic prefix} \\ l'' & \text{CSI reference signal configurations 0-27, extended cyclic prefix} \end{cases}$$

$$w_{l''} = \begin{cases} 1 & p \in \{15, 17, 19, 21\} \\ (-1)^{l''} & p \in \{16, 18, 20, 22\} \end{cases}$$

$$l'' = 0, 1$$

$$m = 0, 1, \ldots, N_{RB}^{DL} - 1$$

$$m' = m + \left\lfloor \frac{N_{RB}^{max,DL} - N_{RB}^{DL}}{2} \right\rfloor$$

TABLE 6.10.5.2-1

Mapping from CSI reference signal configuration to (k', l') for normal cyclic prefix

| | CSI reference signal configuration | Number of CSI reference signals configured | | | | | |
|---|---|---|---|---|---|---|---|
| | | 1 or 2 | | 4 | | 8 | |
| | | (k', l') | $n_s$ mod 2 | (k', l') | $n_s$ mod 2 | (k', l') | $n_s$ mod 2 |
| Frame structure type 1 and 2 | 0 | (9, 5) | 0 | (9, 5) | 0 | (9, 5) | 0 |
| | 1 | (11, 2) | 1 | (11, 2) | 1 | (11, 2) | 1 |
| | 2 | (9, 2) | 1 | (9, 2) | 1 | (9, 2) | 1 |
| | 3 | (7, 2) | 1 | (7, 2) | 1 | (7, 2) | 1 |
| | 4 | (9, 5) | 1 | (9, 5) | 1 | (9, 5) | 1 |
| | 5 | (8, 5) | 0 | (8, 5) | 0 | | |
| | 6 | (10, 2) | 1 | (10, 2) | 1 | | |
| | 7 | (8, 2) | 1 | (8, 2) | 1 | | |
| | 8 | (6, 2) | 1 | (6, 2) | 1 | | |
| | 9 | (8, 5) | 1 | (8, 5) | 1 | | |
| | 10 | (3, 5) | 0 | | | | |

TABLE 6.10.5.2-1-continued

Mapping from CSI reference signal configuration to (k', l') for normal cyclic prefix

| | CSI reference signal configuration | Number of CSI reference signals configured | | | | | |
|---|---|---|---|---|---|---|---|
| | | 1 or 2 | | 4 | | 8 | |
| | | (k', l') | $n_s$ mod 2 | (k', l') | $n_s$ mod 2 | (k', l') | $n_s$ mod 2 |
| | 11 | (2, 5) | 0 | | | | |
| | 12 | (5, 2) | 1 | | | | |
| | 13 | (4, 2) | 1 | | | | |
| | 14 | (3, 2) | 1 | | | | |
| | 15 | (2, 2) | 1 | | | | |
| | 16 | (1, 2) | 1 | | | | |
| | 17 | (0, 2) | 1 | | | | |
| | 18 | (3, 5) | 1 | | | | |
| | 19 | (2, 5) | 1 | | | | |
| Frame structure type 2 only | 20 | (11, 1) | 1 | (11, 1) | 1 | (11, 1) | 1 |
| | 21 | (9, 1) | 1 | (9, 1) | 1 | (9, 1) | 1 |
| | 22 | (7, 1) | 1 | (7, 1) | 1 | (7, 1) | 1 |
| | 23 | (10, 1) | 1 | (10, 1) | 1 | | |
| | 24 | (8, 1) | 1 | (8, 1) | 1 | | |
| | 25 | (6, 1) | 1 | (6, 1) | 1 | | |
| | 26 | (5, 1) | 1 | | | | |
| | 27 | (4, 1) | 1 | | | | |
| | 28 | (3, 1) | 1 | | | | |
| | 29 | (2, 1) | 1 | | | | |
| | 30 | (1, 1) | 1 | | | | |
| | 31 | (0, 1) | 1 | | | | |

2D Antenna Arrays

In LTE, support for two-dimensional antenna arrays was introduced where each antenna element has an independent phase and amplitude control, thereby enabling beamforming in both in the vertical and the horizontal dimensions. Such antenna arrays may be (partly) described by the number of antenna columns corresponding to the horizontal dimension $N_h$, the number of antenna rows corresponding to the vertical dimension $N_v$, and the number of dimensions corresponding to different polarizations $N_p$. The total number of antennas is thus $N=N_h N_v N_p$. An example of an antenna where $N_h=8$ and $N_v=4$ is illustrated in FIG. 11, which illustrates on the left side thereof a two-dimensional antenna array of cross-polarized antenna elements ($N_p=2$), with $N_h=4$ horizontal antenna elements and $N_v=8$ vertical antenna elements, and on the right side of FIG. 11 the actual port layout with 2 vertical ports and 4 horizontal ports is illustrated. This could for instance be obtained by virtualizing each port by 4 vertical antenna elements. Hence, assuming cross-polarized ports are present, the UE will measure 16 antenna ports in this example.

However, from a standardization perspective, the actual number of elements antenna array is not visible to the UE, but rather the antenna ports, where each port corresponds to a CSI reference signal. The UE can thus measure the channel from each of these ports. Therefore, we introduce a 2D port layout, described by the number of antenna ports in the horizontal dimension $M_h$, the number of antenna rows corresponding to the vertical dimension $M_v$ and the number of dimensions corresponding to different polarizations $M_p$. The total number of antenna ports is thus $M=M_h M_v M_p$. The mapping of these ports on to the N antenna elements is an eNB implementation issue and thus not visible by the UE. The UE does not even know the value of N; it only knows the value of the number of ports M.

Precoding may be interpreted as multiplying the signal with different beamforming weights for each antenna port prior to transmission. A typical approach is to tailor the precoder to the antenna form factor, i.e. taking into account $M_h$, $M_v$, and $M_p$ when designing the precoder codebook.

A common approach when designing precoder codebooks tailored for 2D antenna arrays is to combine precoders tailored for a horizontal array and a vertical array of antenna ports respectively by means of a Kronecker product. This means that (at least part of) the precoder can be described as a function of $$W_H \otimes W_V$$

where $W_H$ is a horizontal precoder taken from a (sub)-codebook $X_H$ containing $N_H$ codewords and similarly $W_V$ is a vertical precoder taken from a (sub)-codebook $X_V$ containing $N_V$ codewords. The joint codebook, denoted by $X_H \otimes X_V$, thus contains $N_H \cdot N_V$ codewords. The codewords of $X_H$ are indexed with $k=0, \ldots, N_H-1$, the codewords of $X_V$ are indexed with $l=0, \ldots, N_V-1$ and the codewords of the joint codebook $X_H \otimes X_V$ are indexed with $m=N_V \cdot k+l$ meaning that $m=0, \ldots, N_H \cdot N_V-1$.

For LTE Rel-12 UE and earlier, only a codebook feedback for a 1D port layout is supported, with 2, 4 or 8 antenna ports. Hence, the codebook is designed assuming these ports are arranged on a straight line.

Periodic CSI Reporting on a Subset of 2D Antenna Ports

A method has been proposed to use measurements on fewer CSI-RS ports for periodic CSI reports than measurements for the aperiodic CSI reports.

In one scenario, the periodic CSI report framework is identical to legacy terminal periodic CSI report framework. Hence, periodic CSI reports with 2, 4 or 8 CSI-RS ports are used for the P-CSI reporting and additional ports are used for the A-CSI reporting. From UE and eNB perspective, the operations related to periodic CSI reporting is identical to legacy operation.

The full, large 2D port layout CSI measurements of up to 64 ports or even more is only present in the aperiodic reports. Since A-CSI is carried over PUSCH, the payload can be much larger than the small 11-bit limit of the P-CSI using PUCCH format 2.

CSI-RS resource allocation for a 2D antenna array

It has been agreed that for 12 or 16 ports, a CSI-RS resource for class A CSI reporting is composed as an aggregation of K CSI-RS configurations each with N ports. In case of CDM-2, the K CSI-RS resource configurations indicate CSI-RS RE locations according to legacy resource configurations in TS36.211. For 16 ports:

(N,K)=(8,2), (2,8)

For 12 port construction:

(N,K)=(4,3), (2,6)

The ports of the aggregated resource correspond to the ports of component resources according to the following:

The aggregated port numbers are 15, 16, . . . 30 (for 16 CSI-RS ports)

The aggregated port numbers are 15, 16, . . . 26 (for 12 CSI-RS ports)

CSI-RS Antenna Port Numbering

For a given P antenna ports, the Rel-10,12 and 13 precoding codebooks are designed so that the P/2 first antenna ports (e.g. 15-22) should map to a set of co-polarized antennas and the P/2 last antenna ports (e.g. 16-30) are mapped to another set of co-polarized antennas, with an orthogonal polarization to the first set. This is thus targeting cross-polarized antenna arrays. FIG. 12 illustrates antenna port numbering for a case of P=8 ports.

Hence, the codebook principles for the rank 1 case are that a DFT "beam" vector is chosen for each set of P/2 ports and a phase shift with QPSK alphabet is used to co-phase the two sets of antenna ports. A rank 1 codebook is thus constructed as $$\begin{pmatrix} a \\ ae^{i\omega} \end{pmatrix}$$

where a is a length P/2 vector that forms a beam for the first and second polarizations respectively and ω is a co-phasing scalar that co-phases the two orthogonal polarizations.

Using CSI-RS Signals in NR

In NR, the CSI-RS signal needs to be designed and used for at least similar purposes as in LTE. However, the NR CSI-RS is expected to fulfill additional purposes such as beam management. Beam management is a process whereby eNB and UE beams are tracked which includes finding, maintaining, and switching between suitable beams as UEs move both within and between the coverage areas of multi-beam transmit-receive points (TRPs). This is accomplished by UEs performing measurements on the CSI-RS reference signals and feeding these measurements back to the network for the purposes of beam management decisions.

It is thus a problem how to design a CSI-RS that can be used for "LTE type" of functionality as well as for beam management functionality with both digital and analog beamforming.

An additional point of difference between NR and LTE is that NR will support flexible numerology, i.e., scalable sub-carrier spacing (SCS) with a nominal value of 15 kHz. The nominal value is scalable in powers of 2, i.e., $f_{SC}=15*2^n$ kHz where n=−2, −1, 0, 1, 2, 3, 4, 5. This affects the CSI-RS structure, as larger subcarrier spacings mean that resource elements (REs) can become more spread out in the frequency dimension and this results in a larger distance in frequency between CSI-RS. It is thus a problem how to design CSI-RS to be able to adjust the frequency density depending on the SCS.

One more possible point of difference is that NR may support a shorter transmission duration than LTE. The NR transmission duration is a slot where a slot can be either 7 or 14 OFDM symbols long. In contrast, the transmission duration in LTE is fixed at one subframe which equals 14 symbols.

Additionally, because there is no common reference signals (CRS) in NR, the placement of CSI-RS in NR is not restricted to avoid collisions with NR. Thus, greater flexibility may be used in the design of CSI-RS for NR.

SUMMARY

Several of the techniques and apparatus described herein address the above issues and provide greater flexibility in the design and use of CSI-RS for NR.

Some embodiments of the presently disclosed invention include a method of configuring, in a network node of a wireless communication network, a reference signal resource used to perform channel-state information (CSI) measurements with one or more wireless devices in the wireless communication network. This method comprises the steps of aggregating a reference signal resource in one or more of a frequency and a time domain, and adjusting a density characteristic of the aggregated reference signal resource that is to be transmitted to the one or more wireless devices. In some embodiments, the density characteristic includes at least one of: a number of ports in a radio access node from which the aggregated reference signal resource is to be transmitted; a sampling rate or sample interval of the aggregated reference signal resource; and a frequency band for which the aggregated reference signal resource is allocated. This adjustment of the density characteristic, in some embodiments, may be based at least partially on at least one of: a subcarrier spacing control parameter; a beam management control parameter; and a channel variation measurement parameter.

Other embodiments of the presently disclosed invention include a method, in a network node of a wireless communication network, of selectively configuring variable density reference signal resources used to transmit reference signals for measurement by a wireless device in the wireless communications network, according to one or more of the techniques described herein. In some of these embodiments, the method comprises selecting a resource aggregation from among a plurality of resource aggregations, where each of the plurality of differing resource aggregations has a differing number of resource units and comprises a first number i of OFDM symbols that carry resource units within each transmission slot and a second number j of resource units per each of the first number of OFDM symbols, per each of one or more resource blocks. Each resource block comprises a predetermined number of subcarriers in the frequency domain. The method further includes selecting a third number p of ports, among which the resource units within each transmission slot are allocated. A reference signal resource configuration having a reference signal port density D per resource block is thereby configured. The method further comprises transmitting, for each of the p ports, a reference signal to the wireless device in at least one transmission slot, using the resource units allocated to the respective port in the at least one transmission slot. In some embodiments, the method may further comprise signaling an indication of the reference signal resource configuration to the wireless device.

In some embodiments, the resource units referred to above each consist of two adjacent OFDM resource elements. In some embodiments, the first number i of OFDM symbols within each transmission slot are contiguous.

In some embodiments, transmitting the reference signal for each of the p ports comprises applying an orthogonal cover code to a predetermined signal sequence before transmitting the reference signal. In some embodiments, the method further comprises selecting a subsampling factor SF from a plurality of subsampling factors, each subsampling factor corresponding to a different minimum spacing of reference signal symbols in the frequency domain, thereby defining a reduced density reference signal configuration having a reduced reference signal port density D' per resource block, where D'=D/SF. In these embodiments, transmitting the reference signal to the wireless device in at least one transmission slot comprises transmitting the reference signals according to the reduced density reference signal configuration.

Other embodiments of the present invention include apparatuses corresponding to the above-summarized methods and configured to carry out one or more of these methods, or variants thereof. Thus, embodiments include a network node for use in a wireless communication network, the network node being adapted to configure a reference signal resource used to perform (CSI) measurements with one or more wireless devices in the wireless communication network by: aggregating a reference signal resource in one or more of a frequency and a time domain; and adjusting a density characteristic of the aggregated reference signal resource that is to be transmitted to the one or more wireless devices. In some embodiments, this network node may comprise a processing circuit and a memory operatively coupled to the processing circuit and storing program code for execution by the processing circuit, whereby the network node is configured to carry out these operations.

Other embodiments include another network node, for use in a wireless communication network, this network node being adapted to selectively configure variable density reference signal resources used to transmit reference signals for measurement by a wireless device in the wireless communications network by: selecting a resource aggregation from among a plurality of resource aggregations, each of the plurality of differing resource aggregations having a differing number of resource units and comprising a first number i of OFDM symbols that carry resource units within each transmission slot and a second number j of resource units per each of the first number of OFDM symbols, per each of one or more resource blocks, each resource block comprising a predetermined number of subcarriers in the frequency domain; and selecting a third number p of ports, among which the resource units within each transmission slot are allocated. By performing these selecting operations, a reference signal resource configuration having a reference signal port density D per resource block is thereby defined. This network node is further adapted to transmit, for each of the p ports, a reference signal to the wireless device in at least one transmission slot, using the resource units allocated to the respective port in the at least one transmission slot. Again, in some embodiments, this network node may comprise a processing circuit and a memory operatively coupled to the processing circuit and storing program code for execution by the processing circuit, whereby the network node is configured to carry out these operations.

Still other embodiments comprise systems that include one or more of the network nodes summarized above, in addition to one or more wireless devices. Yet other embodiments comprise computer program products and computer-readable media storing computer program products, where the computer program products comprise program instructions for execution by a processor of a network node, such that the network node is thereby operative to carry out one or more of the methods summarized above or variants thereof, as detailed further, below.

BRIEF DESCRIPTION OF THE DRAWINGS

The drawings illustrate selected embodiments of the disclosed subject matter. In the drawings, like reference labels denote like features.

FIG. 16 is a graphical illustration of two different NR slot sizes and the example location of CSI-RS units therein.

FIG. 18 is a graphical illustration of various example port number mappings that correspond to the resource allocation configurations of FIG. 17.

DETAILED DESCRIPTION

Figure 1:
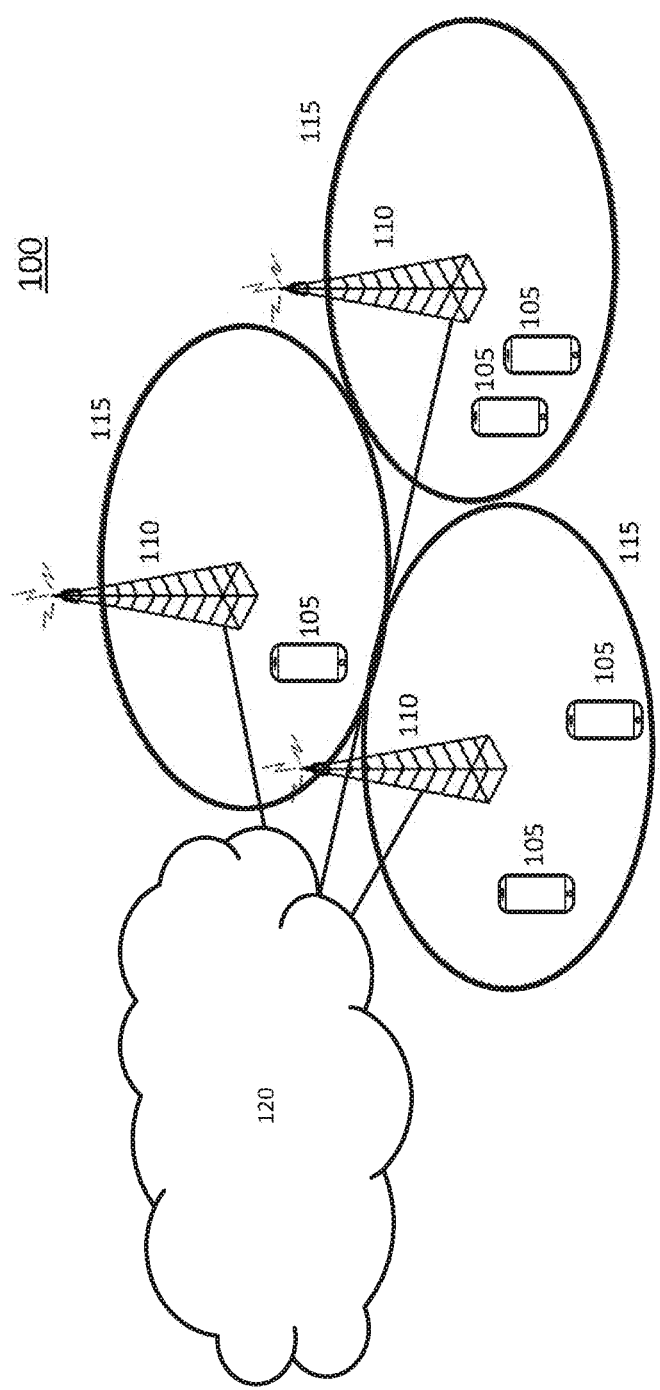
FIG. 1 is a diagram illustrating an LTE network.

The following description presents various embodiments of the disclosed subject matter. These embodiments are presented as teaching examples and are not to be construed as limiting the scope of the disclosed subject matter. For example, certain details of the described embodiments may be modified, omitted, or expanded upon without departing from the scope of the described subject matter.

Radio Node: As used herein, a "radio node" is either a radio access node or a wireless device.

Controlling Node: As used herein, a "controlling node" either a radio access node or a wireless device used to manage, control or configure another node.

Radio Access Node: As used herein, a "radio access node" is any node in a radio access network of a cellular communications network that operates to wirelessly transmit and/or receive signals. Some examples of a radio access node include, but are not limited to, a base station (e.g., an enhanced or evolved Node B (eNB) in a Third Generation Partnership Project (3GPP) Long Term Evolution (LTE) network), a high-power or macro base station, a low-power base station (e.g., a micro base station, a pico base station, a home eNB, or the like), and a relay node.

Core Network Node: As used herein, a "core network node" is any type of node in a Core Network (CN). Some examples of a core network node include, e.g., a Mobility Management Entity (MME), an Evolved-Serving Mobile Location Center (E-SMLC), a Packet Data Network (PDN) Gateway (P-GW), a Service Capability Exposure Function (SCEF), or the like.

Wireless Device: As used herein, a "wireless device" is any type of device that is capable of wirelessly transmitting and/or receiving signals to/from another wireless device or to/from a network node in a cellular communications network to obtain has access to (i.e., be served by) the cellular communications network. Some examples of a wireless device include, but are not limited to, a User Equipment (UE) in a 3GPP network, a Machine Type Communication (MTC) device, an NB-IoT device, a FeMTC device, etc.

Network Node: As used herein, a "network node" is any node that is either part of the radio access network or the CN of a cellular communications network/system or a test equipment node.

Signaling: As used herein, "signaling" comprises any of: high-layer signaling (e.g., via Radio Resource Control (RRC) or a like), lower-layer signaling (e.g., via a physical control channel or a broadcast channel), or a combination thereof. The signaling may be implicit or explicit. The signaling may further be unicast, multicast or broadcast. The signaling may also be directly to another node or via a third node.

The differences between LTE and NR drive a design for CSI-RS that is very flexible in terms of the CSI-RS resource density both in the time and frequency dimensions. For example, for large subcarrier spacings (e.g., 240 kHz), it is necessary to have a significantly higher density in the frequency domain than for the nominal subcarrier spacing of 15 kHz so as to maintain similarly spaced samples of the frequency selective channel. On the other hand, for beam management purposes, it is often necessary to have a fairly spare density in frequency. Hence, what is needed for NR is a very flexible and configurable/controllable density to suit a wide range of use cases. This high flexibility is lacking from the LTE CSI-RS design.

A CSI-RS design with a highly flexible/controllable CSI-RS antenna port density is desirable for NR. According to some of the presently disclosed techniques, the density may be controlled in one or both of two general ways:

1) The number of ports assigned to an aggregated CSI-RS resource is configurable by the network. Fewer ports assigned to a resource translates to higher port density and vice versa.

2) Subsampling of the aggregated CSI-RS in the frequency domain is configurable by network. Increased subsampling of a resource translates to lower port density and vice versa.

Flexible/controllable CSI-RS port density allows a single CSI-RS framework to be easily adapted to suit a wide range of use cases and deployment scenarios necessary for NR. The foregoing two general control features may be used individually or jointly to suit the scenario of interest. Such flexibility improves NR system performance across all subcarrier spacings and operating carrier frequencies, for both analog beamforming and digital front ends.

According to some embodiments of the presently disclosed techniques, a basic CSI-RS "unit" may be defined as two adjacent resource elements (REs) contained within one OFDM symbol in a slot. This is a modular approach, which then can be extended to support various needs and use cases of a NR deployment. A technical advantage of the basic unit being two REs adjacent in frequency but in same symbol, compared to the different approach used in LTE, is better flexibility in overlapping these with other reference signals, such as the new tracking reference signal designed for NR.

The CSI-RS units may be aggregated to form a CSI-RS resource. The CSI-RS resource is signaled from the network (gNB, eNB, TRP, . . . ) to the UE and the UE then performs CSI measurements on this CSI-RS resource and the UE feeds back CSI measurement reports to the network. The network then uses this information for link adaptation and/or beam selection and/or beam management.

Figure 13:
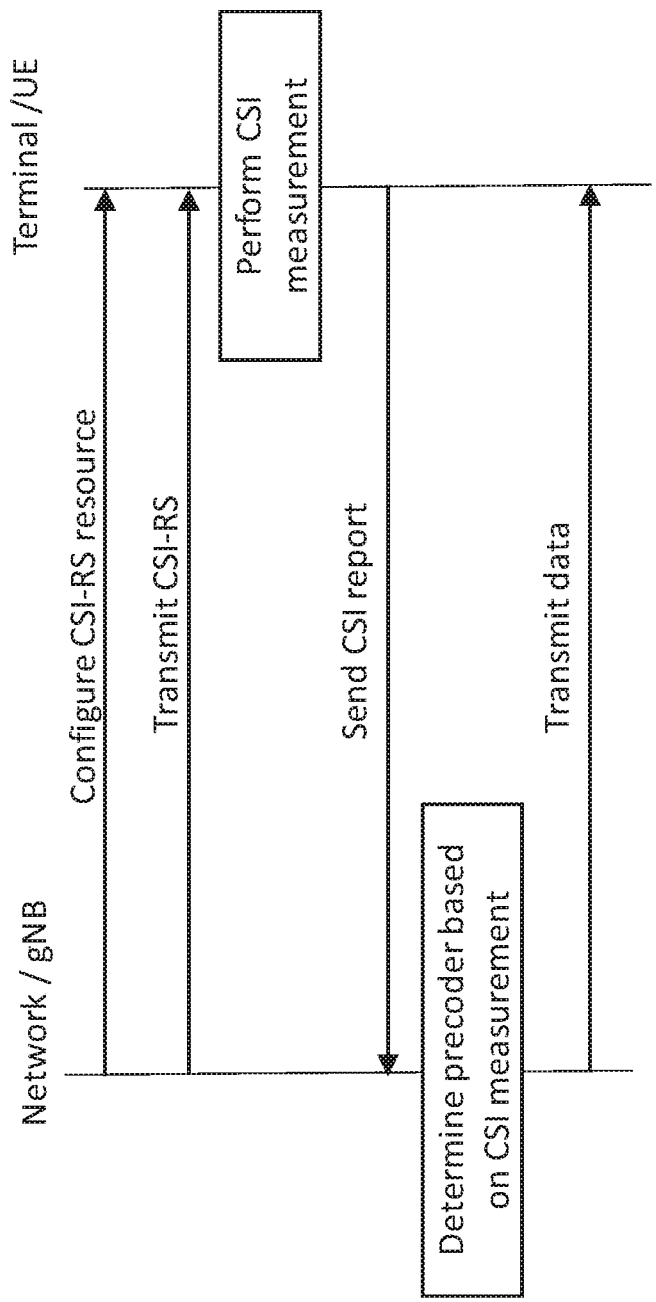
FIG. 13 is an example signaling diagram between a radio access node of a wireless communications network and a wireless communication device.

FIG. 13 depicts a signaling diagram between a radio access node of a wireless communications network (denoted "Network/gNB") and a wireless communication device (denoted "Terminal/UE") in which the network configures CSI-RS resources for CSI feedback and transmits CSI-RS to the wireless communication device/UE. Measurements are then performed in the UE, and a CSI report is sent as feedback to the network. Data may then be transmitted from the radio access node to the wireless communication device, e.g., based on a precoder that is determined from the CSI reports.

Figure 14:
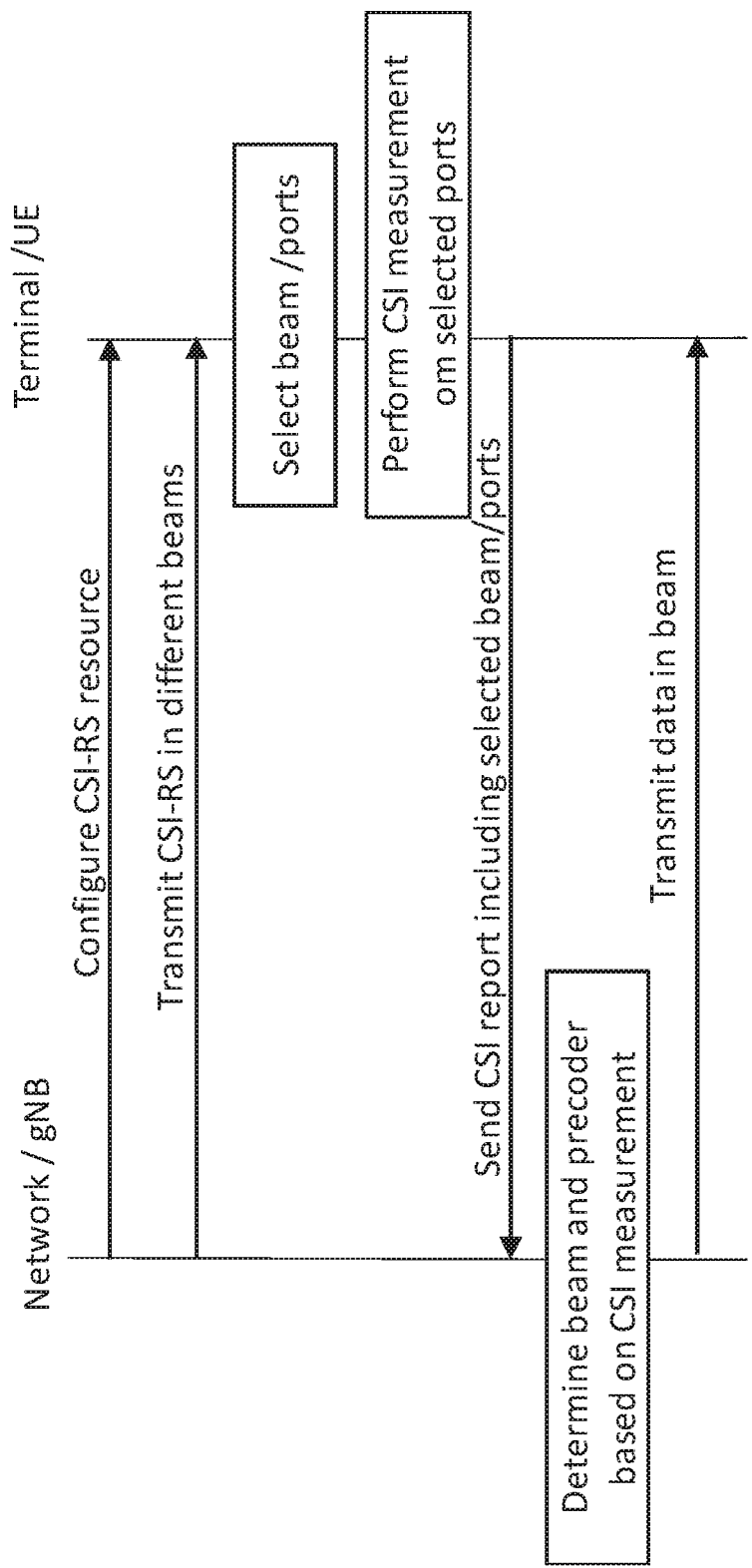
FIG. 14 is another example signaling diagram between a radio access node of a wireless communications network and a wireless communication device.

FIG. 14 depicts a similar signaling diagram. However, in FIG. 14, a beam management setup is also depicted, in which the wireless communication device selects beams. More particularly, the CSI-RS resource contains N ports which are divided into B beams, so that each beam has N/B ports. The wireless communication device selects the desired subset of N/B ports, i.e. the beam, to use for the CSI feedback.

Figure 15:
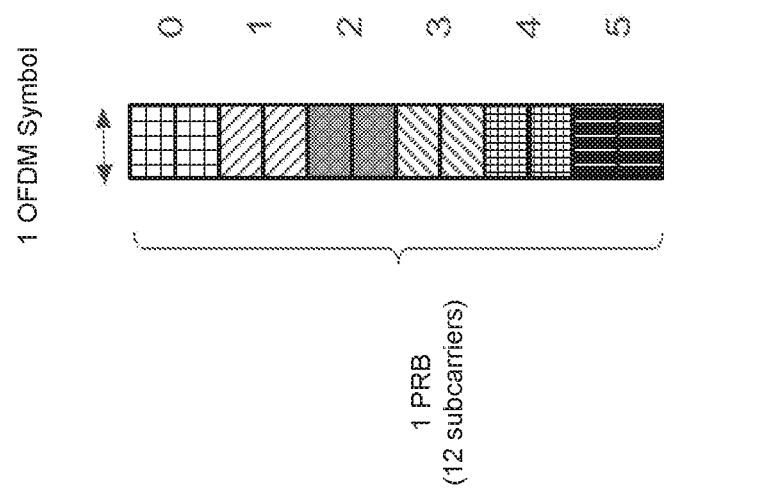
FIG. 15 is a graphical illustration of an OFDM symbol having six CSI-RS units in one PRB.

FIG. 15 depicts an OFDM symbol in a slot having six CSI-RS units that fit within one PRB (12 subcarriers). Each different color represents a different unit. A length-6 bitmap may be used to indicate from the network to the UE whether each of the units or combinations (aggregations) of units are part of a CSI-RS resource or not. The bitmap values for each individual CSI-RS unit are shown in Table 1 below.

TABLE 1

Bitmap values for each individual CSI-RS unit

| CSI-RS Unit | Length-6 Bitmap |
| --- | --- |
| 0 | 100000 |
| 1 | 010000 |
| 2 | 001000 |
| 3 | 000100 |

TABLE 1-continued

Bitmap values for each individual CSI-RS unit

| CSI-RS Unit | Length-6 Bitmap |
|---|---|
| 4 | 000010 |
| 5 | 000001 |

The location of the CSI-RS units within a slot are described in specifications by the "anchor locations" listed in
Table 2 below. In each row of this table, the first value of the anchor location indicates a subcarrier index and the second value 'x' indicates an OFDM symbol index where x={0, 1, 2, . . . , 6} in the case of a 7-symbol slot and x={0, 1, 2, . . . , 13} for the case of a 14 symbol slot. Example locations for the two different NR slot sizes are shown in FIG. 16.

TABLE 2

Anchor locations for CSI-RS units.

| CSI-RS Unit | Anchor Location |
|---|---|
| 0 | (11, x) |
| 1 | (9, x) |
| 2 | (7, x) |
| 3 | (5, x) |
| 4 | (3, x) |
| 5 | (1, x) |

A CSI-RS resource is defined as an aggregation of CSI-RS units and further also with a port assignment which is also signaled from the network to the UE. Moreover, a CSI-RS resource may also include the resource blocks for which the CSI-RS resource is valid. In some cases, the CSI-RS does not span the whole system bandwidth but only a partial bandwidth. Note that the figures shown in the present application only show a single or two RBs, but these RB patterns may be repeated over the whole configured set of RBs (typically the whole system bandwidth, or the bandwidth for which the UE supports CSI measurements).

In the next two subsections, the flexible aggregation part is described followed by the flexible port assignment part. Together these comprise one aspect of several embodiments of the presently disclosed techniques and apparatus. Another aspect of some embodiments (flexible resource subsampling) is described in the 3rd sub-section.

Flexible Resource Aggregation

A CSI-RS resource in several embodiments of the present invention is defined as the flexible aggregation of (a) resource units per OFDM symbol, and (b) OFDM symbols plus a port assignment to the aggregated resource. The definition of the CSI-RS may possibly also include the supported set of multiple RBs over where this CSI-RS port extends.

For (b), the aggregated OFDM symbols may be either contiguous/adjacent or non-contiguous. For ease of discussion, it is assumed that the OFDM symbols comprising the resource are contained within the same slot. However, in some embodiments they may span more than one slot. A use case for non-contiguous OFDM symbols in a CSI-RS resource within a slot can be to support frequency error estimation and tracking for the UE (which requires some time spacing between the reference signals for accuracy).

Figure 17:
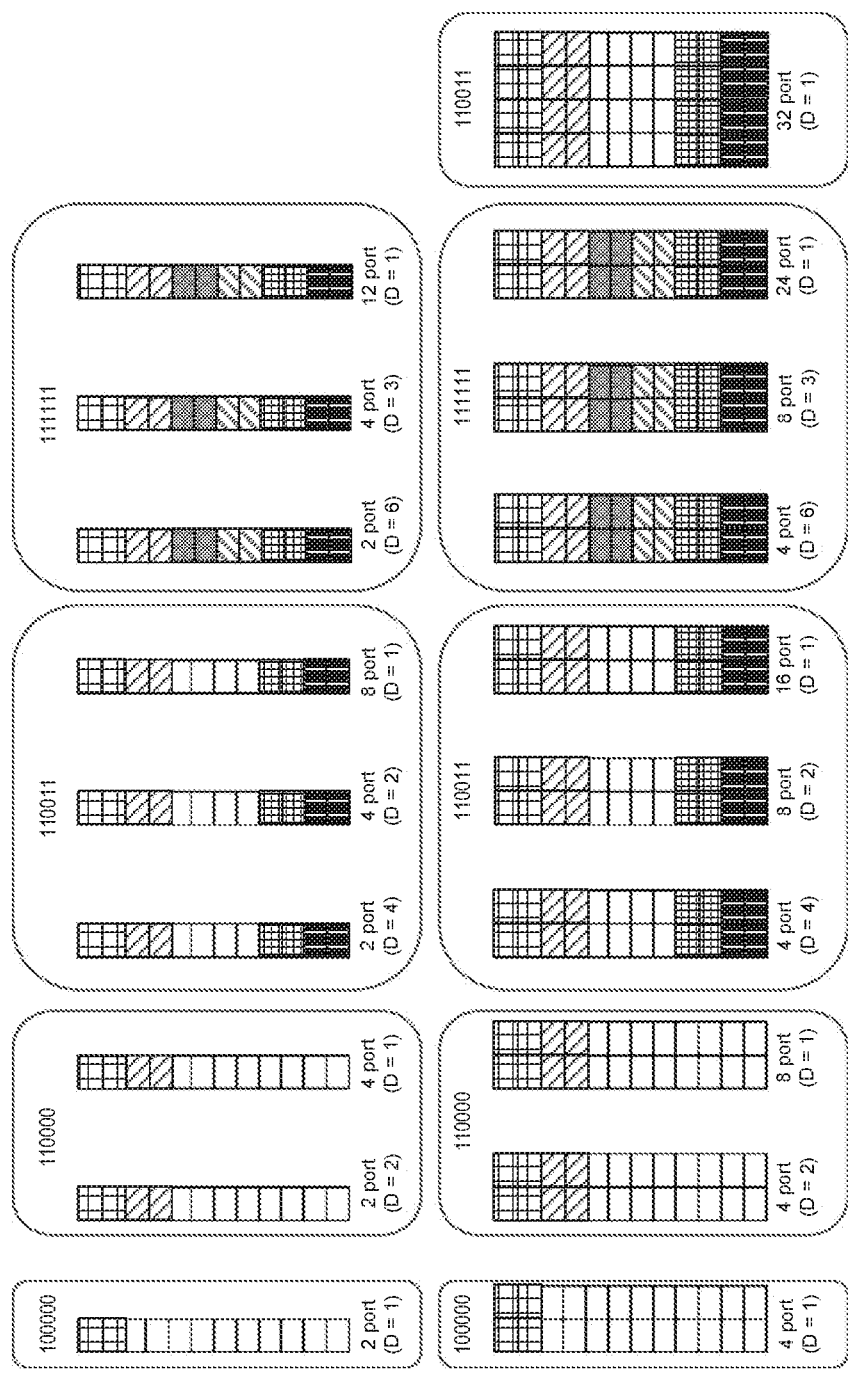
FIG. 17 is a graphical illustration of various resource allocation configurations in which CSI-RS units may be aggregated.

FIG. 17 shows example aggregations for the case of 1, 2, and 4 contiguous OFDM symbols. The bitmap at the top of each box indicates the CSI-RS units that form the basis of the aggregation per OFDM symbol. For example, bitmap 110011 indicates that the aggregation is formed from 4 different CSI-RS units: 1 (the top two subcarriers in each OFDM symbol), 2 (the next two subcarriers), 5 (the pair of subcarriers just above the bottom two subcarriers), and 6 (the bottom two subcarriers).

With such resource aggregations that span both time (OFDM symbols) and frequency (subcarriers, i.e. units), in some embodiments, orthogonal cover codes (OCCs) may be applied as in LTE within and/or between CSI-RS units. The use of OCCs is useful in order to collect more energy per port if they are applied across time. If they are applied across frequency, larger CSI-RS power boosting may be applied without violating a potential fixed threshold on the peak to average power ratio across resource elements.

Flexible Port Assignment

In order to control the port density in an aggregated CSI-RS resource, a flexible port assignment scheme is adopted in some embodiments of the presently disclosed techniques.

With this approach, a network node can assign a variable number of ports to an aggregated resource within a CSI-RS resource.

If a small number of ports is assigned to a larger aggregated resource, then a high port density is achieved, since each port is represented in a large number of resource elements. This is useful in the case of large sub-carrier spacing. Hence, it is possible to control the port density D (defined as number of resource elements per port per resource block) depending on the use case with this configuration.

Several examples are shown in each box in FIG. 17. For example, in the $3^{rd}$ box from the left on the bottom row, the assignment of 4 ports, 8 ports, and 16 ports is shown. In each of these aggregations, there are 16 REs, hence the port density, D, in the three cases is 4, 2, and 1 REs/port/PRB, respectively. In all cases when the number of ports is less than the number of REs, the port density is greater than 1 RE/port/PRB. This is beneficial for larger subcarrier spacings so as to maintain similarly spaced samples of the channel in the frequency domain compared to the case if a smaller subcarrier spacing was used.

FIG. 18 shows example port number mappings for several of the resource allocations shown in FIG. 17. In one embodiment, the port numbers are mapped across frequency first (CSI-RS units) and then across time (OFDM symbols). As can be seen, a given port number appears D times within the resource which is consistent with the definition of port density in terms of REs/port/PRB.

Flexible Resource Subsampling

In the previous two subsections entitled "Flexible Resource Aggregation" and "Flexible Port Assignment," methods for achieving flexible and controllable density D of greater than or equal to 1 RE/port/PRB is described. In this subsection, a second aspect of certain embodiments is described whereby flexible density reduction capable of producing densities of less than 1 RE/port/PRB is described (D<1). This is useful for several purposes. One is for beam management purposes, where often a beam sweep is used to discover the "direction" of the UE for use in beamforming future control and data transmissions. For this type of application, it is useful to have a relatively sparse CSI-RS density in the frequency dimension. A reason is that often analog beamforming is used (at high carrier frequencies such as 28 GHz), and the beam is thus wideband and the corresponding RE used for an CSI-RS antenna port can be spread out over the bandwidth (this may be referred to, in relative terms, as a low frequency sampling rate or, equivalently, a large sampling interval).

Another application for spare CSI-RS density is in scenarios where the channel varies relatively slowly in the frequency dimension, hence frequent sampling in frequency is not necessary. A sparser pattern can lead to higher data transmission peak rates since more resources are available for multiplexing data symbols with the CSI-RS symbols.

Flexible and controllable density reduction also for D<1 is achieved in certain embodiments of the invention by subsampling the aggregated CSI-RS resource by a subsampling factor SF=1, 2, 3, 4, . . . where SF=1 means no subsampling and SF>1 means that a CSI-RS symbol is located at most every SF subcarriers in the frequency domain. Subsampling results in a frequency "comb" structure where the spacing of the comb tines is equal to SF. It will be appreciated that a higher SF, i.e., a higher subsampling factor, results in a higher sampling rate, in that the CSI-RS symbols are more closely spaced, i.e., having a smaller sample interval.

Figure 19:
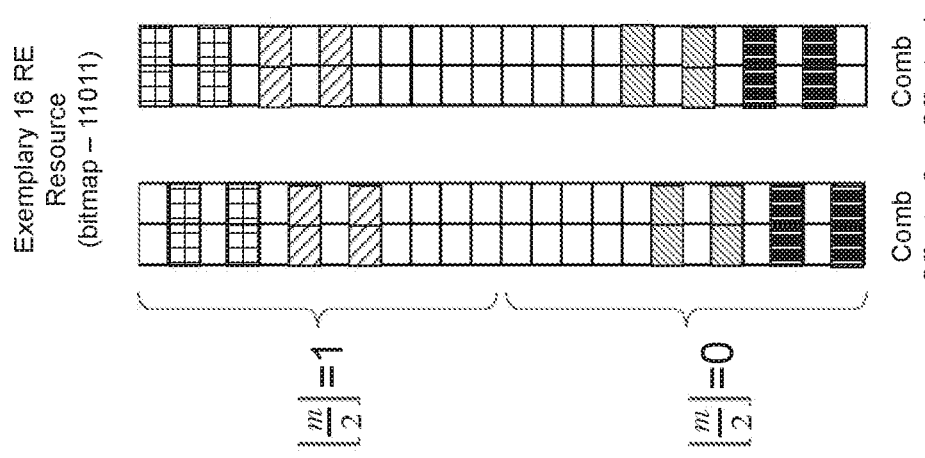
FIG. 19 is a graphical illustration of two possible comb patterns or structures resulting from a subsampling of an aggregated CSI-RS resource.

FIG. 19 shows an example comb for a 16 RE resource using SF=2 (two different comb offsets that are possible for SF=2 are shown). If 16 ports are assigned to this aggregated resource, then the use of SF=2 results in a density of D=½ which is less than 1 RE/port/PRB as desired.

When such a comb structure is used, there are SF-1 possibilities for introducing an offset of the comb. In FIG. 19 the two possible comb patterns are shown, one with no offset and one with offset value O=1. Use of a comb offset can be beneficial in order to allocate orthogonal combs to two different users—another motivation for density reduction.

Note that in FIG. 19, the value m is a PRB index where m spans a particular bandwidth. This may be the whole system bandwidth or a portion thereof, for example a partial band allocated to a given user. In this example, the CSI-RS units span two different PRBs, since subsampling with SF=2 is used. Generally, the number of PRBs spanned by the CSI-RS units is equal to SF.

Figure 20:
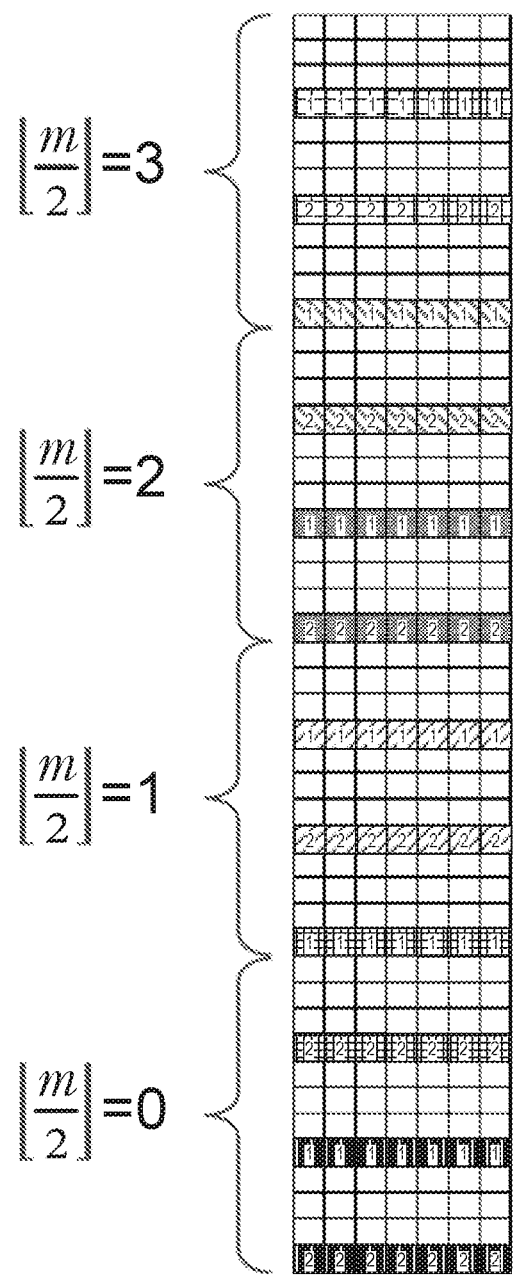
FIG. 20 is a graphical illustration of another possible comb pattern or structure resulting from a subsampling of an aggregated CSI-RS resource.

Yet another example of resource subsampling is shown FIG. 20 where subsampling factor SF=4 is used on a pattern using all 6 CSI-RS units (bitmap=111111) and 2 ports are assigned. With zero samples in between the "stripes" in this figure, the pattern is referred to as interleaved frequency division multiple access (IFDMA). This type of pattern is useful for beam sweeping operations performed in the context of beam management. Here, a different eNB transmit (Tx) beam can be used in each OFDM symbol. Then within each OFDM symbol, the UE can sweep its Rx beam 4 times (equal to the SF) since the IFDMA pattern creates a periodic time domain waveform with period=4 within each OFDM symbol.

Using the above techniques allows for a very flexible and scalable definition of an CSI-RS resource for NR which can support a wide range of carrier frequencies (1-100 GHz), implementation choices (digital or analog beamforming). For example, embodiments of the presently disclosed techniques allow for definition of the CSI-RS resource according to one or more of the following aspects:
  1. Aggregated resource units in frequency domain (one OFDM symbol)
     a. Described by a length-6 bitmap indicating a particular combination of unit 1, 2, 3, 4, 5, and 6
  2. Aggregated resource units in time domain
     a. OFDM symbol indices over which to aggregate 3. Number of ports assigned to the aggregated resource
  4. Subsample factor SF=1, 2, 3, 4, . . . and Comb Offset=0, 1, . . . , SF-1
  5. A frequency band for which the CSI-RS resource is allocated (partial band, whole band)
  6. OCC configuration (if used)

The described embodiments may be implemented in any appropriate type of communication system supporting any suitable communication standards and using any suitable components. As one example, certain embodiments may be implemented in an LTE network, such as that illustrated in FIG. 1.

Referring to FIG. 1, a communication network 100 comprises a plurality of wireless communication devices 105 (e.g., conventional UEs, machine type communication [MTC]/machine-to-machine [M2M] UEs) and a plurality of radio access nodes 110 (e.g., eNodeBs or other base stations). Communication network 100 is organized into cells 115, which are connected to a core network 120 via corresponding radio access nodes 110. Radio access nodes 110 are capable of communicating with wireless communication devices 105 along with any additional elements suitable to support communication between wireless communication devices or between a wireless communication device and another communication device (such as a landline telephone).

Figure 2:
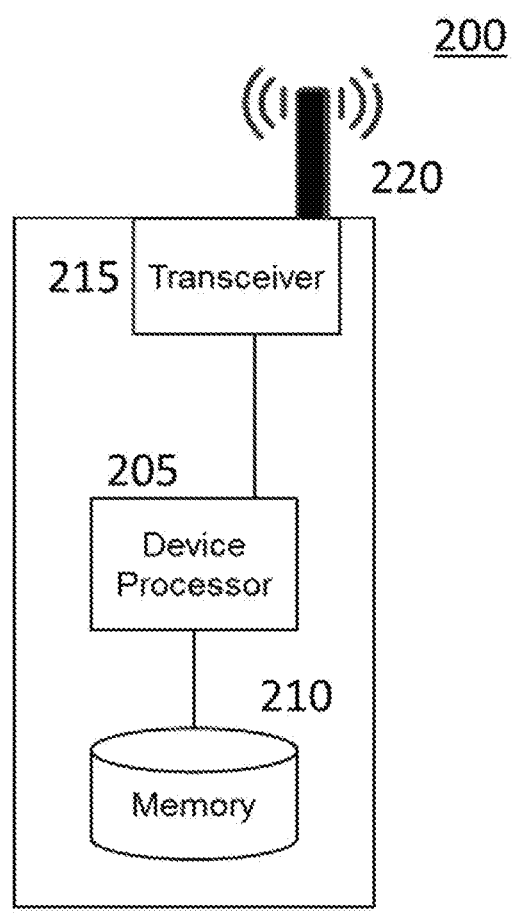
FIG. 2 is a diagram illustrating a wireless communication device.

Although wireless communication devices 105 may represent communication devices that include any suitable combination of hardware and/or software, these wireless communication devices may, in certain embodiments, represent devices such as an example wireless communication device illustrated in greater detail by FIG. 2. Similarly, although the illustrated radio access node may represent network nodes that include any suitable combination of hardware and/or software, these nodes may, in particular embodiments, represent devices such as the example radio access node illustrated in greater detail by FIG. 3.

Referring to FIG. 2, a wireless communication device 200 comprises a processor 205, a memory, a transceiver 215, and an antenna 220. In certain embodiments, some or all of the functionality described as being provided by UEs, MTC or M2M devices, and/or any other types of wireless communication devices may be provided by the device processor executing instructions stored on a computer-readable medium, such as the memory shown in FIG. 2. Alternative embodiments may include additional components beyond those shown in FIG. 2 that may be responsible for providing certain aspects of the device's functionality, including any of the functionality described herein. It will be appreciated that the device processor 205 may comprise one or more microprocessors, microcontrollers, digital signal processors, and the like, with these one or more processing elements being configured to execute program code stored in memory 210, to control the transceiver 215 and to execute all or some of the functionality described herein, and may include, in some embodiments, hard-coded digital logic that carries out all or some of the functionality described herein. The term "processing circuit" is used herein to refer to any one of these combinations of processing elements.

Figure 3:
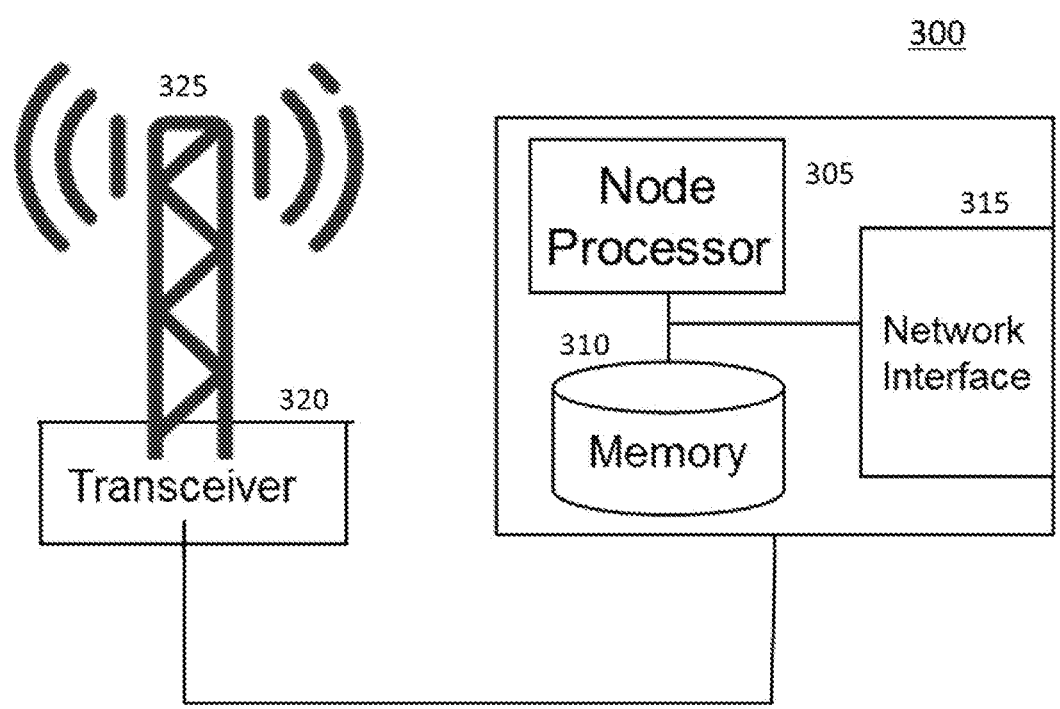
FIG. 3 is a diagram illustrating a radio access node.

Referring to FIG. 3, a radio access node 300 comprises a node processor 305, a memory 310, a network interface 315, a transceiver 320, and an antenna 325. Again, it will be appreciated that the node processor 305 may comprise one or more microprocessors, microcontrollers, digital signal processors, and the like, with these one or more processing elements being configured to execute program code stored in memory 310, to control the transceiver 320 and the network 315 and to execute all or some of the functionality described herein, and may include, in some embodiments, hard-coded digital logic that carries out all or some of the functionality described herein. This functionality includes, for example, the operations shown in the flowcharts of FIGS. 4 and 5. The term "processing circuit" is used herein to refer to any one of these combinations of processing elements.

Thus, in certain embodiments, some or all of the functionality described as being provided by a base station, a node B, an eNodeB, and/or any other type of network node may be provided by node processor 305 executing instructions stored on a computer-readable medium, such as memory 310 shown in FIG. 3. Again, this functionality includes, for example, the operations shown in the flowcharts of FIGS. 4 and 5. Alternative embodiments of radio access node 300 may comprise additional components to provide additional functionality, such as the functionality described herein and/or related supporting functionality.

Figure 4:
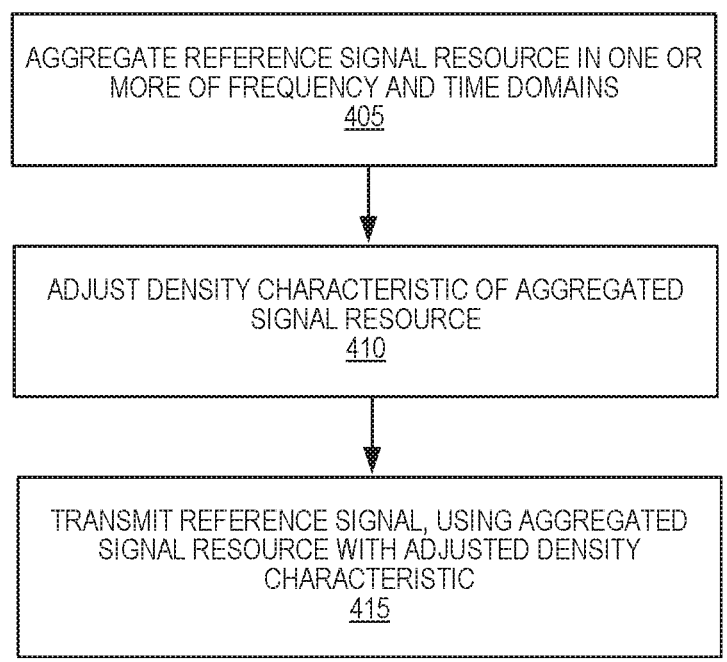
FIG. 4 is a flowchart illustrating a method of operating a network node.

FIG. 4 is a flowchart illustrating an example method 400 of operating a network node (e.g., a radio access node 110). The method 400 comprises a step 405 in which a reference signal resource is aggregated in one or more of a frequency and a time domain. The method further comprises a step 410 in which a density characteristic of the aggregated reference signal resource that is to be transmitted to the one or more wireless devices (105) is adjusted. The method further comprises a step 415 in which a reference signal is transmitted to each of the one or more wireless devices (105), using the aggregated reference signal resource with the adjusted density characteristic. The method may still further comprise, in some embodiments, signaling an indication of the aggregated reference signal resource with the density characteristic to the one or more wireless devices (105).

Figure 5:
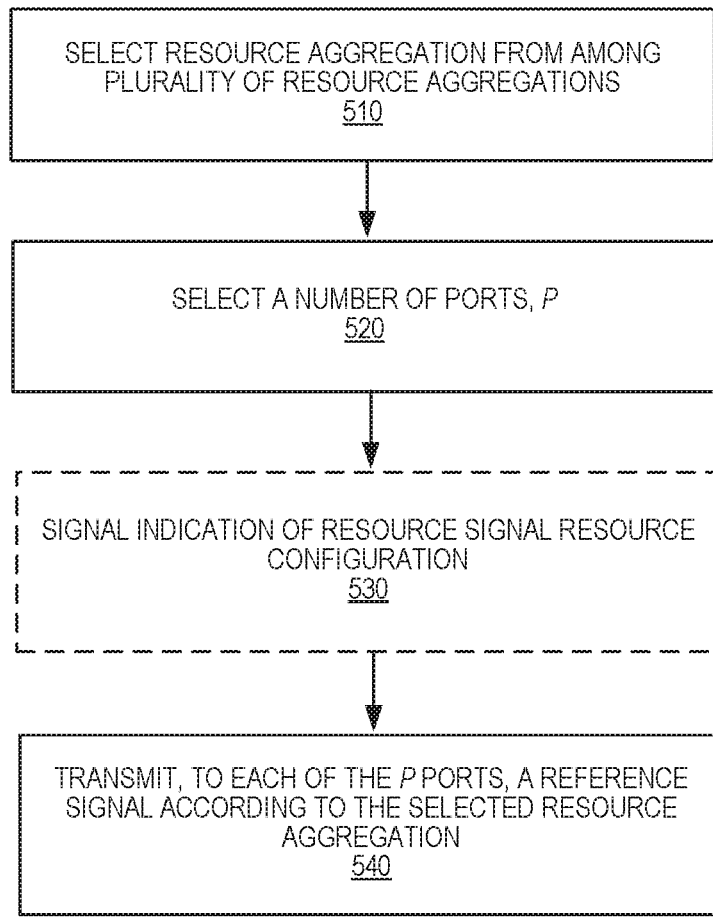
FIG. 5 is a diagram illustrating a network node.
Figure 6:
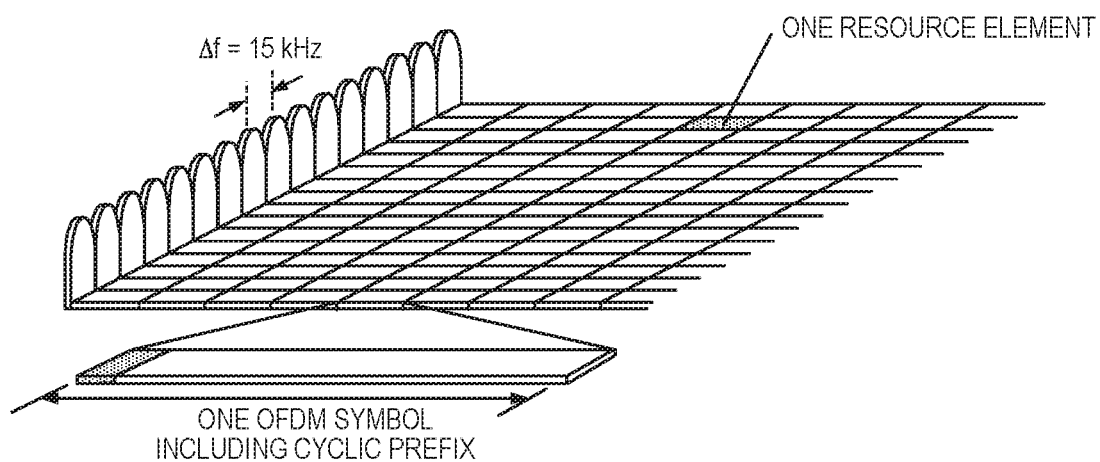
FIG. 6 is a schematic diagram of an example Orthogonal Frequency Division Multiplexing (OFDM) downlink physical resource.
Figure 7:
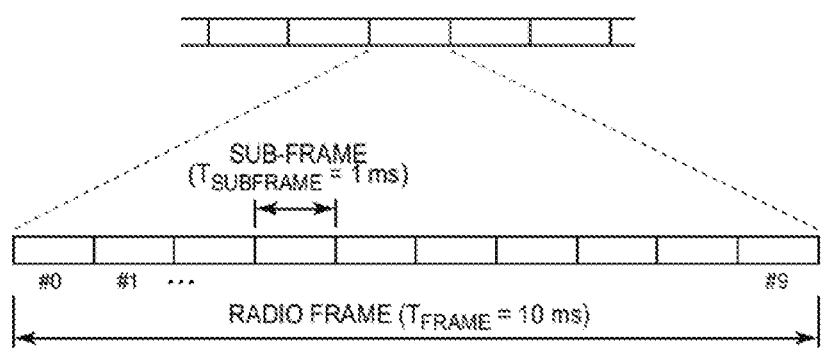
FIG. 7 is a schematic diagram of an example OFDM time-domain structure.
Figure 8:
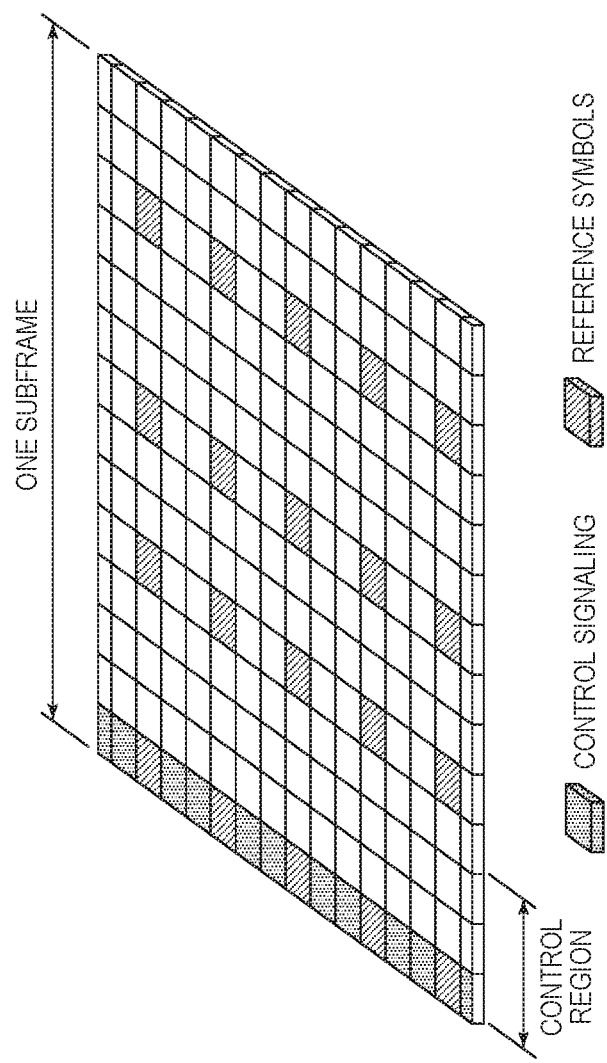
FIG. 8 is a schematic diagram of an example OFDM downlink subframe.
Figure 9:
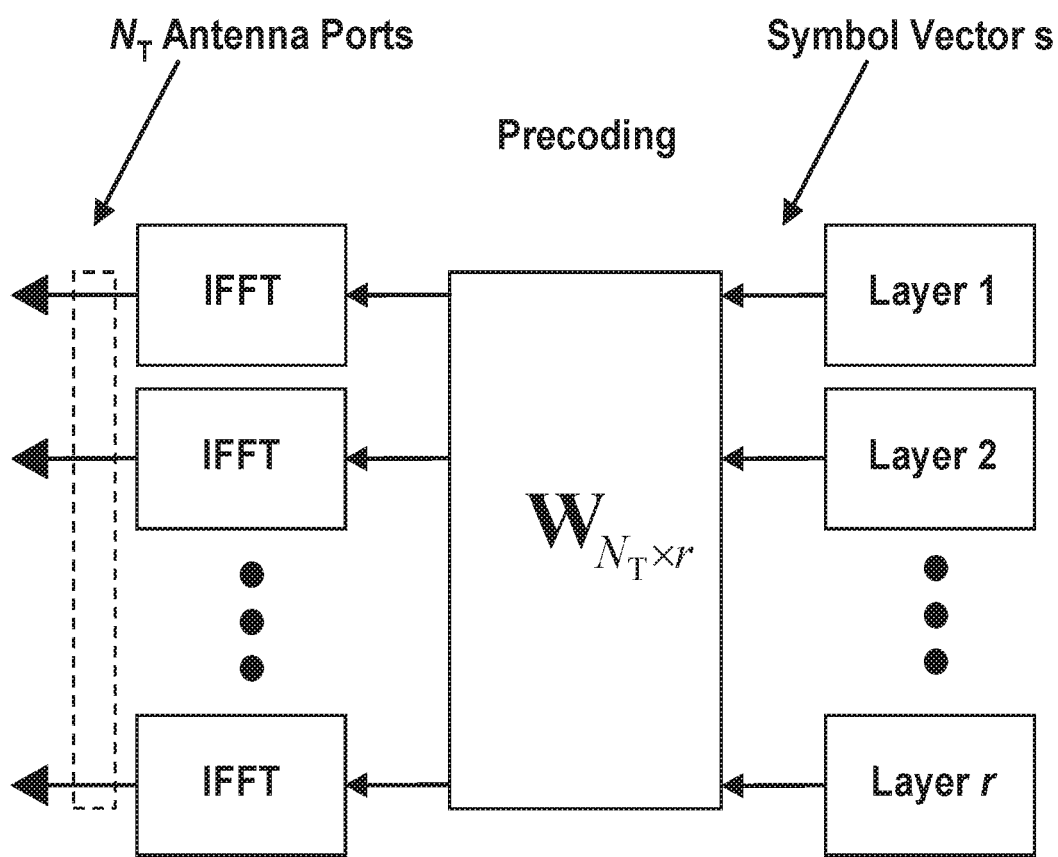
FIG. 9 is a functional block diagram of a spatial multiplexing operation.
Figure 10:
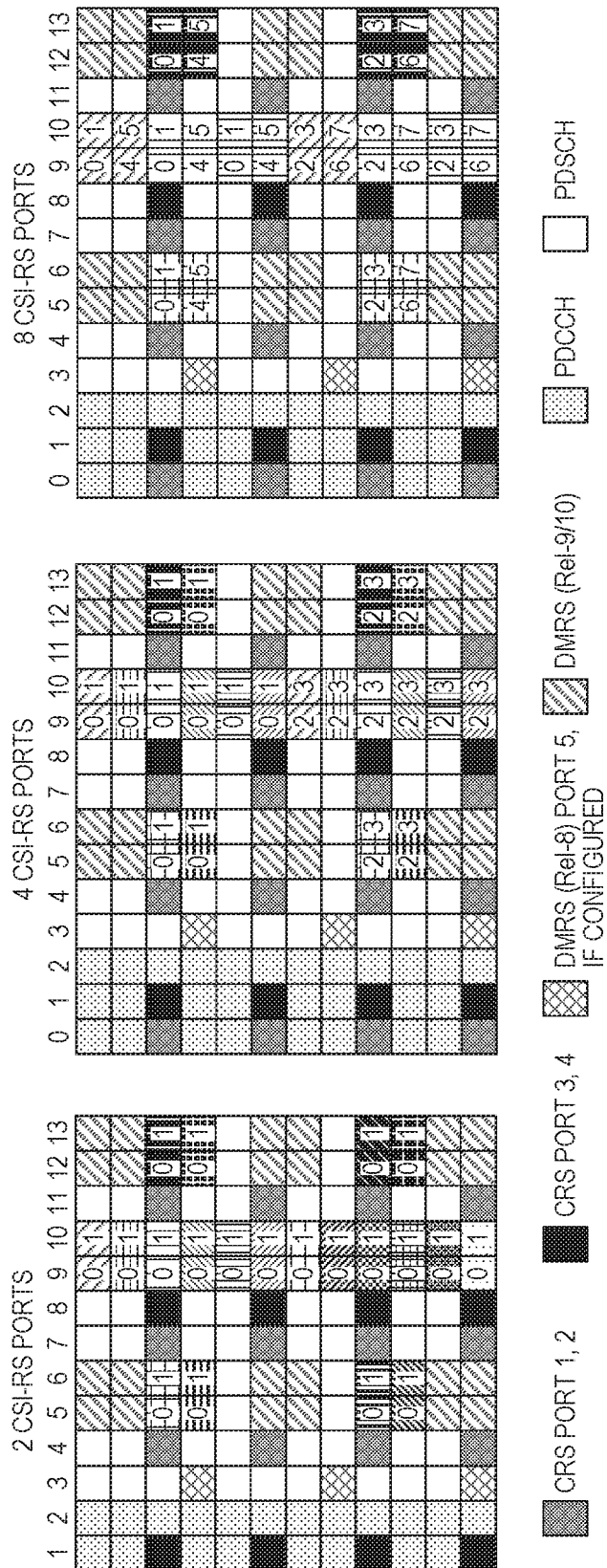
FIG. 10 is a graphical illustration of example resource element grids over an RB pair.
Figure 11:
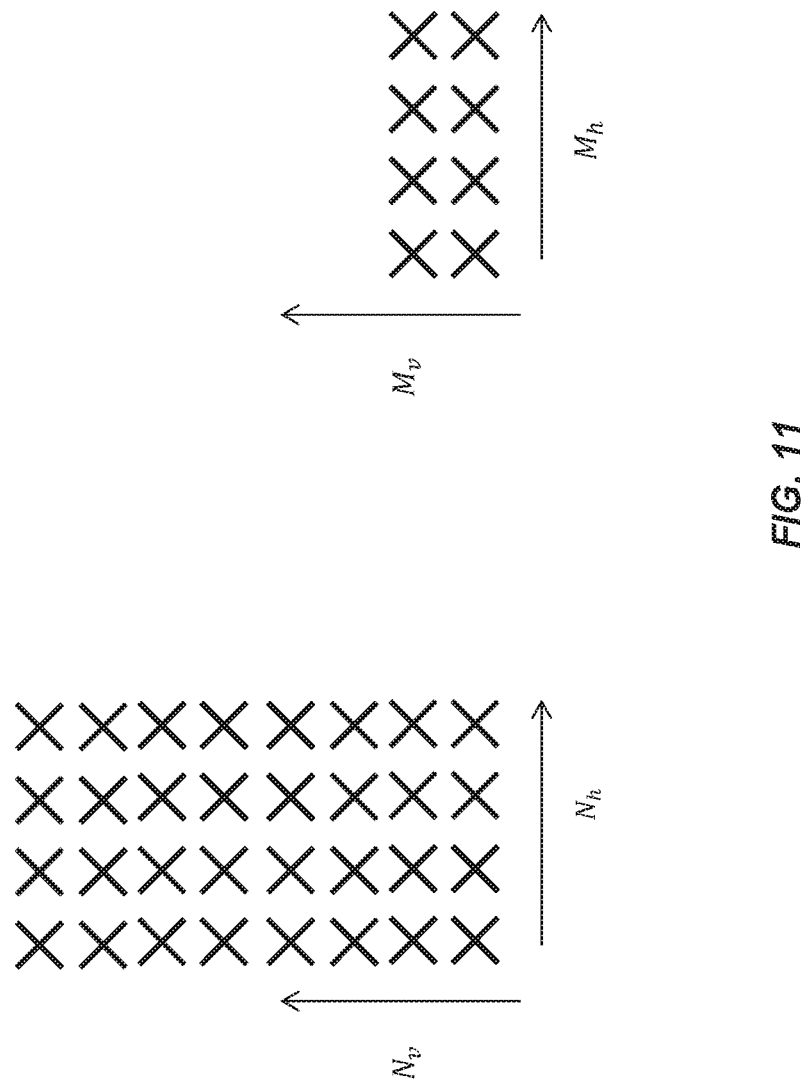
FIG. 11 is a graphical illustration of an example antenna array and its corresponding port layout.
Figure 12:
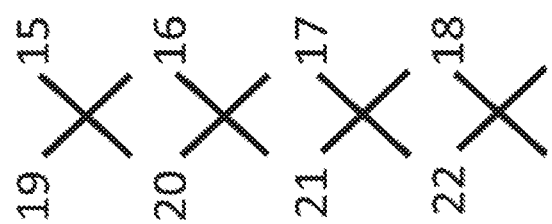
FIG. 12 is a graphical illustration of an example numbering scheme for antenna ports.

FIG. 5 illustrates another flowchart, this flowchart showing an example method 500, in a network node (110) of a wireless communication network, of selectively configuring variable density reference signal resources used to transmit reference signals for measurement by a wireless device in the wireless communications network, according to one or more of the techniques described herein.

As seen at block 510, the illustrated method comprises selecting a resource aggregation from among a plurality of resource aggregations, where each of the plurality of differing resource aggregations has a differing resource of resource units and comprises a first number i of OFDM symbols that carry resource units within each transmission slot and a second number j of resource units per each of the first number of OFDM symbols, per each of one or more resource blocks. Each resource block comprises a predetermined number of subcarriers in the frequency domain.

As seen at block 520, the method further comprises selecting a third number p of ports, among which the resource units within each transmission slot are allocated. With the performing of the steps shown in blocks 510 and 520, as described above, a reference signal resource configuration having a reference signal port density D per resource block is thereby configured.

As seen at block 540, the method further comprises transmitting, for each of the p ports, a reference signal to the wireless device in at least one transmission slot, using the resource units allocated to the respective port in the at least one transmission slot. In some embodiments, the method may further comprise signaling an indication of the reference signal resource configuration to the wireless device, as shown at block 530.

In some embodiments, the resource units referred to above each consist of two adjacent OFDM resource elements. In some embodiments, the first number i of OFDM symbols within each transmission slot are contiguous.

In some embodiments, transmitting the reference signal for each of the p ports comprises applying an orthogonal cover code to a predetermined signal sequence before transmitting the reference signal. In some embodiments, the method further comprises selecting a subsampling factor SF from a plurality of subsampling factors, each subsampling factor corresponding to a different minimum spacing of reference signal symbols in the frequency domain, thereby defining a reduced density reference signal configuration having a reduced reference signal port density D' per resource block, where D'=D/SF. In these embodiments, transmitting the reference signal to the wireless device in at least one transmission slot comprises transmitting the reference signals according to the reduced density reference signal configuration.

As described above, the exemplary embodiments provide both methods and corresponding apparatuses consisting of various modules providing functionality for performing the steps of the methods. The modules may be implemented as hardware (embodied in one or more chips including an integrated circuit such as an application specific integrated circuit), or may be implemented as software or firmware for execution by a processor. In particular, in the case of firmware or software, the exemplary embodiments can be provided as a computer program product including a computer-readable storage medium embodying computer program code (i.e., software or firmware) thereon for execution by the computer processor. The computer readable storage medium may be non-transitory (e.g., magnetic disks; optical disks; read only memory; flash memory devices; phase-change memory) or transitory (e.g., electrical, optical, acoustical or other forms of propagated signals-such as carrier waves, infrared signals, digital signals, etc.). The coupling of a processor and other components is typically through one or more busses or bridges (also termed bus controllers). The storage device and signals carrying digital traffic respectively represent one or more non-transitory or transitory computer readable storage medium. Thus, the storage device of a given electronic device typically stores code and/or data for execution on the set of one or more processors of that electronic device such as a controller.

Although the embodiments and its advantages have been described in detail, it should be understood that various changes, substitutions, and alterations can be made herein without departing from the spirit and scope thereof as defined by the appended claims. For example, many of the features and functions discussed above can be implemented in software, hardware, or firmware, or a combination thereof. Also, many of the features, functions, and steps of operating the same may be reordered, omitted, added, etc., and still fall within the broad scope of the various embodiments.

LIST OF ABBREVIATIONS

TRP—Transmission/Reception Point
UE—User Equipment
NW—Network
BPL—Beam pair link
BLF—Beam pair link failure
BLM—Beam pair link monitoring
BPS—Beam pair link switch
RLM—radio link monitoring
RLF—radio link failure
PDCCH—Physical Downlink Control Channel RRC—Radio Resource Control
CRS—Cell-specific Reference Signal
CSI-RS—Channel State Information Reference Signal
RSRP—Reference signal received power
RSRQ—Reference signal received quality
gNB—NR base station
PRB—Physical Resource Block
RE—Resource Element

What is claimed is:

1. A method of configuring, in a network node of a wireless communication network, a reference signal resource used to perform channel-state information, CSI, measurements with one or more wireless devices in the wireless communication network, the method comprising:
aggregating a reference signal resource in a frequency domain; and
wherein the aggregated reference signal resource has an associated port density characteristic based on a number of ports in a radio access node from which the aggregated reference signal resource is to be transmitted, and
wherein the port density characteristic is based at least partially on a beam management control parameter.

2. The method of claim 1, further comprising signaling an indication of the aggregated reference signal resource with the port density characteristic to the one or more wireless devices.

3. The method of claim 1, further comprising transmitting a reference signal to each of the wireless devices, using the aggregated reference signal resource with the port density characteristic.

4. The method of claim 1, wherein the reference signal resource is further aggregated in a time domain.

5. A network node for use in a wireless communication network, the network node comprising:
a processor; and
a memory containing instructions that, when executed by the processor, cause the network node to configure a reference signal resource used to perform channel-state information, CSI, measurements with one or more wireless devices in the wireless communication network by:
aggregating a reference signal resource in a frequency domain; and
wherein the aggregated reference signal resource has an associated port density characteristic based on a number of ports in a radio access node from which the aggregated reference signal resource is to be transmitted,
wherein the port density characteristic is based at least partially on a beam management control parameter.

6. The network node of claim 5, wherein the instructions, when executed by the processor, further cause the network node to configure the reference signal resource by signaling an indication of the aggregated reference signal resource with the port density characteristic to the one or more wireless devices.

7. The network node of claim 5, wherein the instructions, when executed by the processor, further cause the network node to transmit a reference signal to each of the wireless devices, using the aggregated reference signal resource with the port density characteristic.

8. The network node of claim 5, wherein the reference signal resource is further aggregated in a time domain.

9. A method of a wireless device receiving and using reference signals in a wireless communication network, the method comprising:
receiving a first indication of:
a first aggregated CSI-RS resource, and
a first density characteristic associated with the first aggregated CSI-RS resource,
the first indication indicating how a plurality of resource units are aggregated in at least a frequency domain to form the first aggregated CSI-RS resource;
receiving a first CSI-RS based at least partially on the first indication of the first aggregated CSI-RS resource and the first density characteristic;
receiving a second indication of:
a second aggregated CSI-RS resource, and
a second density characteristic associated with the second aggregated CSI-RS resource,
the second indication indicating how a plurality of resource units are aggregated in at least a frequency domain to form the second aggregated CSI-RS resource;
receiving a second CSI-RS based at least partially on the second indication of the second aggregated CSI-RS resource and the second density characteristic;
wherein the wireless device uses the first CSI-RS to estimate channel state information and uses the second CSI-RS for beam management reporting.

10. The method of claim 9, wherein the first and second density characteristics are based on a number of ports in a radio access node from which the respective first and second aggregated CSI-RS resources are to be transmitted.

11. The method of claim 9, wherein the second density characteristics is based at least partially on a beam management control parameter.

12. A wireless device for use in a wireless communication network, the wireless device comprising:
a processor; and
a memory containing instructions that, when executed by the processor, cause the wireless device to estimate channel state information and perform beam management reporting by:
receiving a first indication of:
a first aggregated CSI-RS resource, and
a first density characteristic associated with the first aggregated CSI-RS resource,
the first indication indicating how a plurality of resource units are aggregated in at least a frequency domain to form the first aggregated CSI-RS resource;
receiving a first CSI-RS based at least partially on the first indication of the first aggregated CSI-RS resource and the first density characteristic;
receiving a second indication of:
a second aggregated CSI-RS resource, and
a second density characteristic associated with the second aggregated CSI-RS resource,
the second indication indicating how a plurality of resource units are aggregated in at least a frequency domain to form the second aggregated CSI-RS resource;
receiving a second CSI-RS based at least partially on the second indication of the second aggregated CSI-RS resource and the second density characteristic;
wherein the wireless device uses the first CSI-RS to estimate channel state information and uses the second CSI-RS for beam management reporting.

* * * * *